Figure 1:
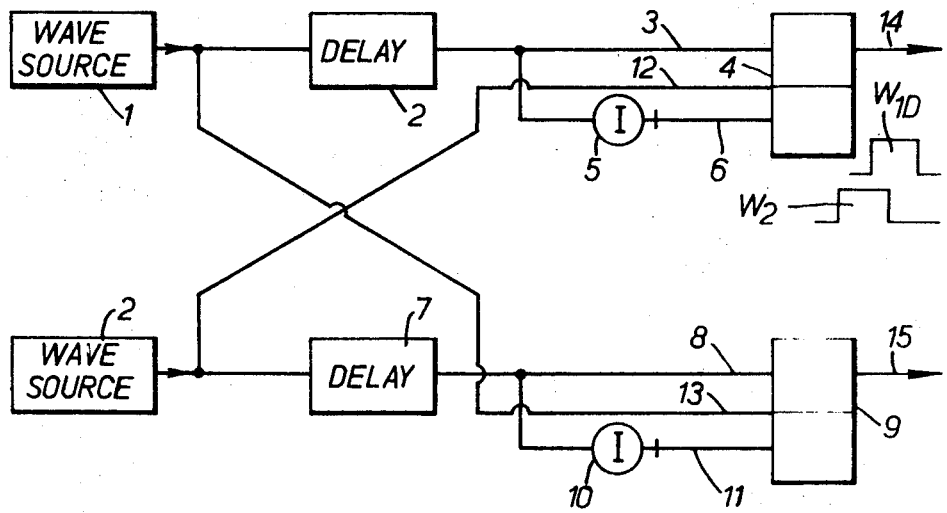

United States Patent

[11] 3,600,690

[72] Inventor Colin Graham White
 Essex, England
[21] Appl. No. 40,305
[22] Filed May 25, 1970
[45] Patented Aug. 17, 1971
[73] Assignee The Marconi Company Limited
 London, England
[32] Priority June 23, 1969
[33] Great Britain
[31] 31505/69

[54] PHASE DIFFERENCE DETECTORS
 2 Claims, 2 Drawing Figs.
[52] U.S. Cl. .................................................. 328/133,
 307/232, 307/295, 324/83 D
[51] Int. Cl. ......................................................... H03d 13/00
[50] Field of Search .......................................... 307/232,
 262, 269, 295; 328/109, 133, 155; 324/83 D, 83 Q;
 329/137

[56] References Cited
UNITED STATES PATENTS
3,430,148 2/1969 Miki ............................. 307/232 X
3,510,683 5/1970 Rotier .......................... 328/133 X
3,518,556 6/1970 Holmboe et al. ............. 328/133

Primary Examiner—Stanley T. Krawczewicz
Attorney—Baldwin, Wight and Brown

ABSTRACT: This invention provides a phase difference detector for detecting when the phase relationship between two waves changes from a predetermined relationship by a predetermined amount. Delay means are provided for relatively delaying the two waves to an extend dependent upon the lead or lag tolerance permitted in the phase relationship between the two waves, and a JK flip-flop circuit is provided to one data input terminal of which one of the two relatively delayed waves are applied and to the other data input terminal of which the same wave inverted is applied. The other of the delayed waves is applied to the sampling input terminal of said circuit.

INVENTOR
Colin Graham White
BY
Baldwin Wight Diller & Brown
ATTORNEYS

PHASE DIFFERENCE DETECTORS

This invention relates to phase difference detectors and more particularly to phase difference detectors for detecting phase difference between two similar wave trains.

It is often required to provide some means of indicating when the phase relation between two wave trains changes beyond a certain tolerance This is the case for example in an electronic circuit relying upon the output of a clock oscillator, whose output requires to bear, within a predetermined tolerance, a fixed relation to a reference oscillator. Similar requirements arise in so-called multiple clock oscillator systems, when the outputs of two or more clock oscillators require to be monitored and an indication given when their outputs depart from each other by a predetermined amount. The present invention seeks to provide an improved phase difference detector suitable for use in arrangements such as are exemplified above.

According to this invention a phase difference detector for detecting when the phase relationship between two waves changes from a predetermined relationship by a predetermined amount includes means for relatively delaying said waves to an extent dependent upon the lead or lag tolerance permitted in the phase relationship between the two waves, a JK flip-flop or like circuit, means for applying one of said two relatively delayed waves to one data input terminal of said circuit, means for inverting said one wave and applying it to the other data input terminal of the circuit and means for applying the other of said two relatively delayed waves to the sampling input terminal of said circuit.

Preferably the detector includes a second JK flip-flop or similar circuit, means for applying the said other wave to one data input terminal of the second circuit, means for inverting said other wave and applying it to the other data input terminal of the second circuit and means for applying the said one wave to the sampling input terminal of said second circuit.

Figure 2:
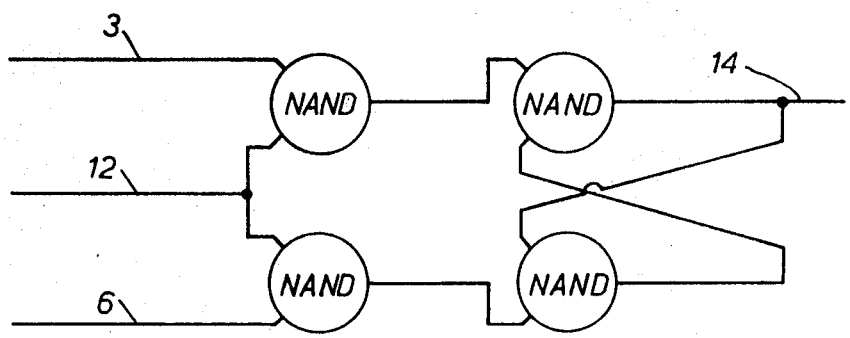

The invention is illustrated in and further described with reference to the accompanying drawing in which FIG. 1 illustrates a phase difference detector in accordance with the present invention and FIG. 2 shows one possible alternative for each of the JK flip-flop circuits used in the arrangement of FIG. 1.

Referring to FIG. 1 it is assumed that it is desired to indicate when the relative phase of the output waves, assumed to be square waves having a mark/space ratio of unity for ease of explanation, slip out of phase by more than a predetermined extent. The two wave sources are shown at 1 and 2 respectively. Output square waves from wave source 1 are applied via a first delay unit 2 directly to one data input terminal 3 of a first JK flip-flop circuit 4 and also via an inverting circuit 5 to the other data input terminal 6 of the JK flip-flop circuit 4. Output waves from the wave source 2 are applied through a second delay unit 7 directly to the first data input terminal 8 of a further JK flip-flop circuit 9 and via a further inverting circuit 10 to the other data input terminal 11 of the JK FLIP-flop circuit 9. The sampling input terminal 12 is connected to have undelayed waves from source 2 applied to it whilst the sampling input terminal 13 of JK flip-flop circuit 9 is connected to have undelayed waves from wave source 1 applied to it. As illustrated, a "1" condition appearing on output lead 14 of JK flip-flop circuit 4 will indicate that the wave form from source 1 is leading the wave form from source 2 by more than a predetermined amount equal to the delay provided by delay unit 2. A "1" output on output terminal 15 of JK flip-flop circuit 9 indicates that the waveform from source 2 is leading the wave form from source 1 by more than a predetermined extent equal to the delay provided by delay unit 7. Usually, of course, the delays provided by the two delay units will be similar since normally the lead and lag tolerances are similar.

The operation of the circuit of FIG. 1 is as follows. The output wave trains from wave sources 1 and 2 are similar. At JK flip-flop circuit 4 a delayed version of the waveform from source 1 is presented for sampling. The wave train from source 2, applied to the sampling input terminal of the JK flip-flop circuit 4 samples the wave train from source 1. As is known, either positive going or negative going edges may be employed to sample the data applied to the data input terminals of a JK flip-flop circuit in dependence upon the nature of the circuit. In the present case positive going edge sampling will be considered. In the wave form diagram shown adjacent JK flip-flop circuit 4, $W_{1D}$ is the delayed version of the wave form from wave source 1 sampled by the wave form $W_2$. So long as source 1 and source 2 are in phase the result of $W_2$ sampling $W_{1D}$ will be a "O" at the output terminal 14 of JK flip-flop circuit 4. If however source 1 leads source 2 by more than the delay of delay unit 2 together with the bistable sampling time, the result of sampling will be a "1" appearing on output terminal 14.

Similarly, when source 2 leads source 1 by more than the delay time of delay unit 7 and the bistable sampling time a "1" will be indicated on the output terminal 15 of JK flip-flop circuit 9.

FIG. 2 shows an interconnected configuration of NAND gates which may be used to replace either of the JK flip-flop circuits 4 or 9 in FIG. 1. Like terminal references are used in FIG. 2 to denote like terminals of JK flip-flip circuit 4 in FIG. 1.

I claim:

1. A phase difference detector for detecting when the phase relationship between two waves changes from a predetermined relationship by a predetermined amount, means for relatively delaying said waves to an extent dependent upon the lead or lag tolerances permitted in the phase relationship between the two waves, a JK flip-flop or like circuit, means for applying one of said two relatively delayed waves to one data input terminal of said circuit, means for inverting said one wave and applying it to the other data input terminal of the circuit and means for applying the other of said two relatively delayed waves to the sampling input terminal of said circuit.

2. A detector as claimed in claim 1 and including a second JK flip-flop or similar circuit, means for applying the said other wave to one data input terminal of the second circuit, means for inverting said other wave and applying it to the other data input terminal of the second circuit and means for applying the said one wave to the sampling input terminal of said second circuit.